Figure 3:
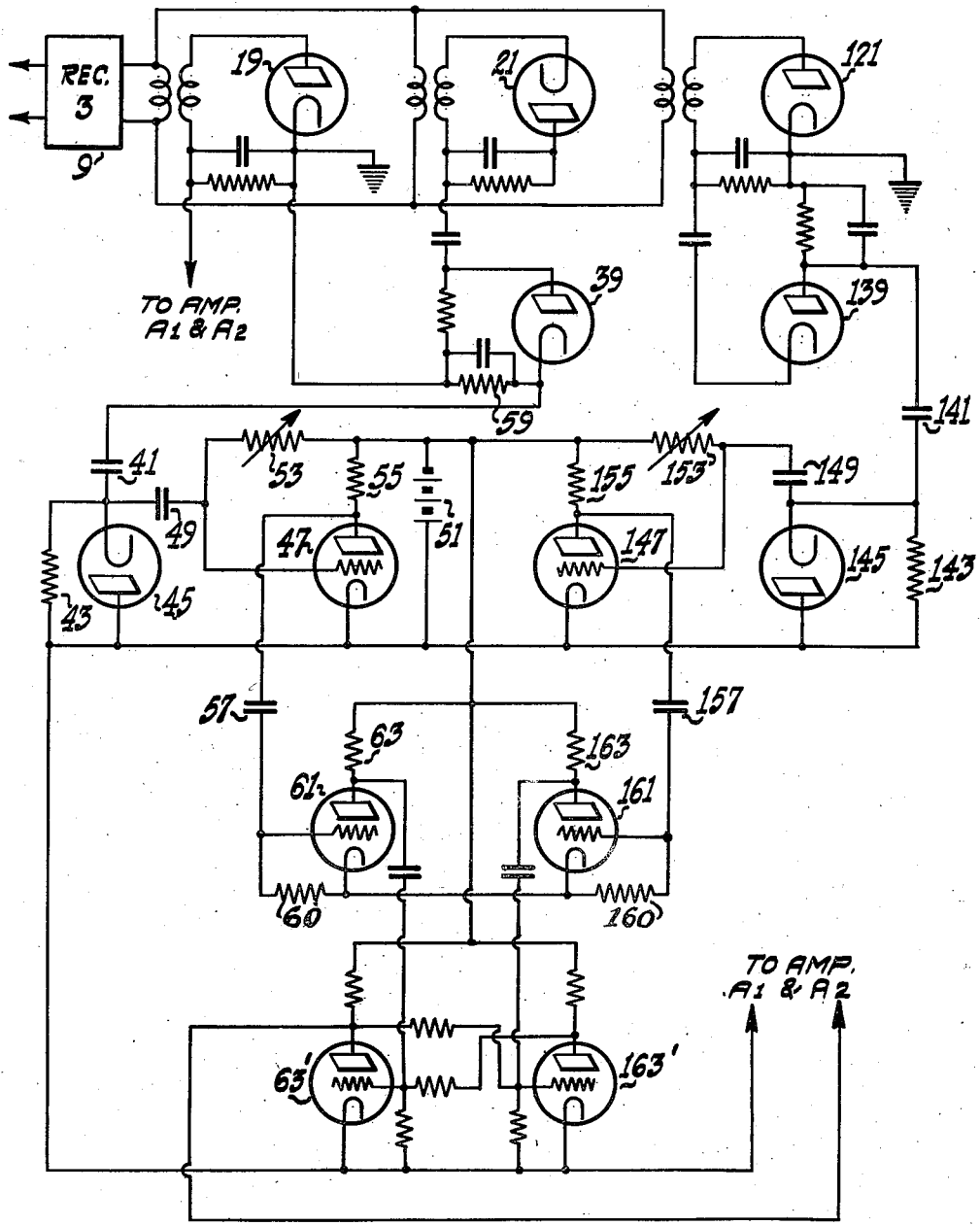

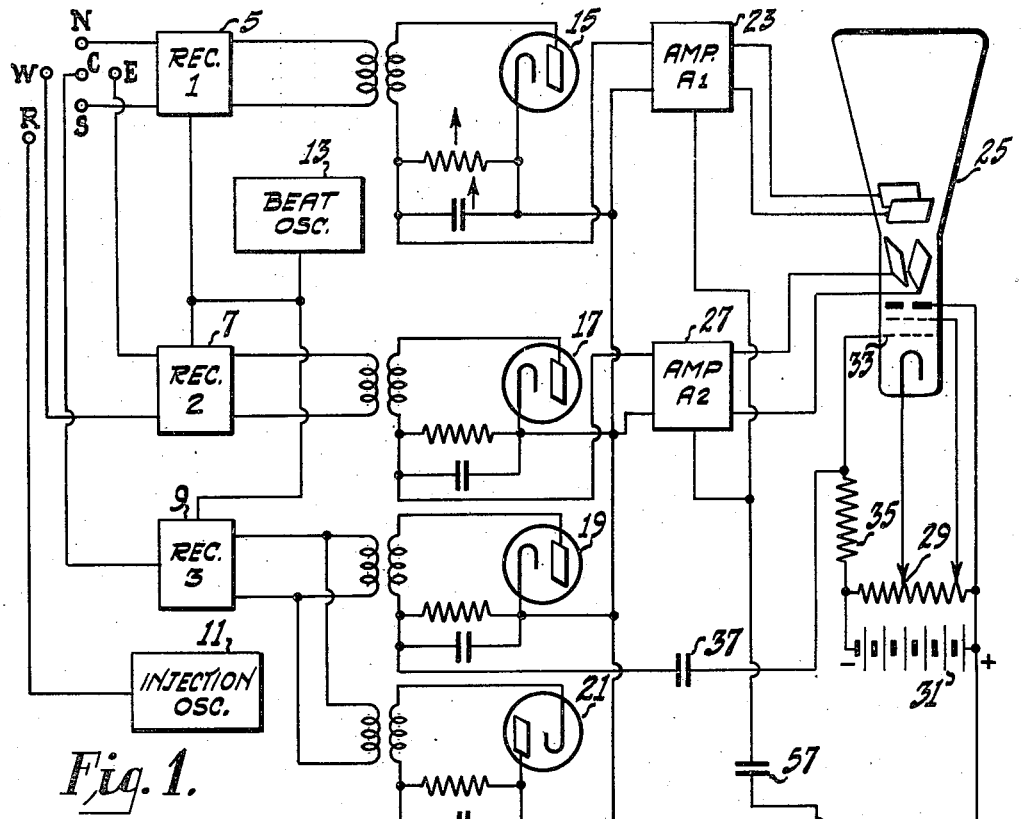

Inventor
LOWELL E. NORTON

Patented June 10, 1947

2,422,122

UNITED STATES PATENT OFFICE 2,422,122

RADIO DIRECTION FINDING

Lowell E. Norton, Collingswood, N. J., assignor to Radio Corporation of America, a corporation of Delaware Application August 28, 1942, Serial No. 456,471

4 Claims. (Cl. 250—11)

This invention relates to radio direction finding, and more particularly to deriving bearing indications from signals travelling over the shortest path from a transmitter to a direction finder. When conditions are such that radio wave propagation occurs over multiple paths, conventional direction finders are likely to produce erroneous bearing indications, due to the fact that they respond to the sum or resultant of the fields produced by the signals arriving over the different paths. Experiments with pulse transmissions have shown that under multiple path propagation conditions, each transmitted pulse is received as a series of pulses, due to differences in the lengths of the various paths. The first pulse to arrive at the receiver travels over the shortest path, and the subsequent pulses, or echoes, usually travel over indirect paths including a series of reflections. A bearing taken on the first pulse is much more likely to be accurate than one taken from a composite signal, or upon components other than the first to arrive.

This phenomenon may be put to practical use with telegraphic signals by providing a system for separating the first part of a signal from the remainder at the receiver, instead of using special pulse transmission.

Accordingly, it is an object of this invention to provide an improved method of and means for direction finding by separating the components of a signal according to their time of arrival and deriving a bearing indication from the component first to arrive.

Another object is to provide an improved method of and means for achieving said separation of first arriving and reflected signals.

A further object is to provide an automatic direction finder system arranged to respond only to the first arriving component of the leading edge of each dot or dash of a telegraphic signal.

These and other and incidental objects will become apparent to those skilled in the art upon consideration of the following description, with reference to the accompanying drawing, in which Figure 1 is a schematic circuit diagram of one embodiment of the invention; Figures 2a–2e are a series of graphical representations of the wave forms of various voltages produced in the operation of the system of Figure 1; Figure 3 is a schematic circuit diagram of another embodiment of the invention; and Figures 4a–4k show the wave forms occurring in the operation of the system of Figure 3.

Referring first to Figure 2a, the keying of a telegraphic signal is shown. A direction finder is to be made operative during the period 1—2, when the first component is received, and inoperative after the time 2 until the next operative interval 3—4.

Figure 1 shows a system arranged for this type of operation. A conventional Adcock array of spaced vertical antennas N, S, E and W is provided, together with a central sense antenna C and an auxiliary radiation injection antenna R. The antenna R is located a short distance away from the Adcock array and on a line approximately 45° from the axes N—S and E—W. The antenna pairs N—S and E—W are connected to radio receivers 5 and 7 respectively. The sense antenna C is connected to a third receiver 9. A local injection oscillator 11 is connected to the antenna R. The receivers 5, 7 and 9 are of the superheterodyne type, and are provided with a common beat frequency oscillator 13. The second detectors 15 and 17 of the receivers 5 and 7 and the second detectors 19 and 21 of the receiver 9 are shown separated from the other parts of the respective receivers for clarity of description.

The output of the detector 15 is connected through an amplifier 23 to one deflection circuit of a cathode ray tube 25, and the output of the detector 17 is connected similarly through an amplifier 27 to the other deflection circuit of the cathode ray tube. Electrode voltages for the tube 25 are picked off a voltage divider 29 connected across a direct current source 31. The control grid 33 of the cathode ray tube is connected through a grid leak 35 to the source 31 and is coupled through a capacitor 37 to the second detector 19 of the receiver 9.

The system thus far described constitutes a conventional form of direct indicating direction finder. In operation, the receivers 5, 7 and 9 are tuned to the frequency at which bearings are to be observed. The oscillator 11 is tuned to a somewhat different frequency. The difference in frequency is not particularly critical, but must not be so large that the product term potentials are shifted differently in phase and amplitude due to slight differences in the several receivers. The tuning controls of the receivers 5, 7 and 9 may be mechanically ganged with that of the oscillator 11 for convenience in operation.

The outputs of the detectors 15, 17 and 19 include voltages of a frequency equal to the difference between the frequency of the oscillator 11 and the frequency of the incoming signal. The amplitude of these components in the output of the detectors 15 and 17 are proportional respectively to the cosine and to the sine of the azimuth of arrival of the signal wave at the antennas. The amplitude of the corresponding component in the output of the detector 19 is constant.

Assuming that the gains of the amplifiers 23 and 27 are equal, the cathode ray beam of the tube 25 will trace a line across a diameter of the screen, with an angular orientation corresponding to the signal azimuth. The output of the detector 19 biases the grid 33 to black out one half of the trace, thus eliminating the 180° ambiguity of the diametrical trace.

As indicated above, the receiver 9 is provided with an auxiliary second detector 21. The output of the detector 21 is applied to another diode 39. The output circuit of the diode 39 is coupled through a small capacitor 41 to a resistor 43. Still another diode 45 is connected as shown across the resistor 43. The resistor 43 is coupled to the grid circuit of a triode tube 47 through a small capacitor 49. A direct current source 51 is provided for the tube 47, and a variable resistor 53 is connected between the positive terminal of said source and the control grid of the tube 47. A load resistor 55 is provided for the plate of the tube 47, which is coupled through a capacitor 57 to the grid bias circuits of the amplifiers 23 and 27.

The operation of the above described circuit is as follows: The output of the diode 39 is direct current, keyed like the telegraphic signal picked up by the direction finder, as illustrated in Figure 2a, which represents the voltage across the resistor 59. The capacitor 41 and the resistor 43 are proportioned so as to function as a differentiating circuit at a frequency determined by the keying rise time and decay time. The voltage across the resistor 43, neglecting the effect of the diode 45, is shown by the curve of Figure 2b. When the diode 45 is conductive, its resistance is low with respect to that of the resistor 43, and the voltage across the resistor 43 is as shown in Figure 2c.

The triode 47 is initially conductive, so its plate is initially less positive than the positive terminal of the source 51, due to the drop in the resistor 55. The grid of the triode 47 is slightly positive with respect to the cathode because of the connection through the resistor 53 to the positive terminal of the source 51.

Under these conditions when the positive impulses shown in Figure 2c are applied to the grid of the tube 47, the capacitor 49 and the grid-to-cathode resistance of the tube 47 act as a differentiation circuit, and the grid-to-cathode potential varies as shown in Figure 2d. The grid side of the capacitor 49 becomes charged to a negative potential and the tube is cut off, remaining cut off for a time determined by the RC product of the adjustable resistor 53 and the capacitor 49.

The amplifiers 23 and 27 are normally biased off, and can operate only during the time the tube 47 is cut off, raising the voltage at the plate. The resistor 53 is manually adjusted to allow only the first pulse of each signal element to pass through before the amplifiers are cut off again. The system therefore becomes operative at time 1 in Figure 2, and becomes inoperative at selected time 2 in Figure 2. Thus the system will indicate bearings only on the signal components which arrive first and are therefore most likely to travel the shortest path corresponding to the true azimuth of the transmitter.

The above described system turns on the bearing indicator upon arrival of a signal, and turns it off immediately thereafter. It may be desirable for various reasons to have the bearing indicator normally ready to operate just before the arrival at the first pulse and cut it off immediately after a signal has arrived, returning it to the operative condition at the end of a predetermined period thereafter. Figure 3 shows a circuit for providing this sequence of operation.

The apparatus is controlled by the output of the sense receiver 9, like the system shown in Figure 1. The diodes 19, 21, 39 and 45, the triode 47, and the associated resistors and capacitors are connected like the correspondingly designated elements in the system of Figure 1. The channel from the detector 21 to the coupling capacitor 57 is duplicated through the channel composed of diodes 121, 139, 145, triode 147, and coupling capacitor 157, except that the starting polarity is reversed. The elements of this second channel have reference numerals like corresponding elements of the first channel, with the numeral 1 prefixed thereto. Aside from the fact that the diodes 121 and 139 are reversed in polarity with respect to the diodes 21 and 39, the two channels are identical.

The two outputs are coupled through the capacitors 57 and 157 to single stage amplifiers including triode tubes 61 and 161, which are in turn coupled to the respective control grids of a pair of tubes 63 and 163.

The tubes 63 and 163 are connected as direct current amplifiers, with the output of each of the tubes connected to the input of the other. Circuits of this type are sometimes called "toggle" circuits because of their snap action characteristics. When one of the tubes, for example the tube 63, is conductive, the other tube 163 is cut off. The circuit will remain in this condition indefinitely unless disturbed, as for example by momentarily overcoming the cut-off bias on the tube 163. When this is done, the circuit "snaps" to the converse condition, with the tube 163 remaining conductive while the tube 63 remains cut off.

The operation of the system of Figure 3 is as follows: The output of the receiver 9 causes the diode 39 to produce keyed direct current as in the system of Figure 1. This is illustrated by the curve of Figure 4a. The output potential of the diode 39 is differentiated by the capacitor 41 and resistor 43, resulting in the voltage shown in Figure 4b. The negative pulses are removed by the diode 45, and the positive pulses applied to the tube 47. The tube 47 is cut off by each of the pulses of this voltage for an interval determined by the product of the capacitor 49 and the resistor 53. The resulting variations of the anode to cathode voltage of the tube 47 are shown in Figure 4c. This interval is the time from the moment when the first component is received until the bearing indicator is shut off at time 6 in Figures 4c, 4d, 4e, 4h. The capacitor 57 and resistor 60 act as a differentiation circuit, producing the wave shown in Figure 4d. The tube 61 is used to reverse the polarity of this voltage, which is then used to start the tube 63 of the toggle circuit, at time 6 in Figure 4e.

The second channel operates in the same manner, but is controlled by the inverse of the keying, due to the reversed connections of the diodes 121 and 139. The curve of Figure 4f shows the output of the diode 139. Figure 4g shows the differentiated wave; Figure 4h shows the anode to cathode voltage of the tube 147; Figure 4i shows the voltage at the grid of the tube 161; Figure 4j shows the output of the tube 161; and Figure 4k shows the output of the toggle circuit, which is taken as shown from the plate of the tube 63. The time during which the tube 147 is cut off is the length of time after the telegraphic signal stops before the indicator is returned to its operative condition. The indicator becomes operative at time 5 in Figures 4h, 4i, 4j, 4k.

The toggle circuit output is applied to the amplifiers 23 and 27 of the direction finder shown in Figure 1, or to any other point in a direction finder circuit where it may be used to control the operation by overcoming a cut-off bias or similar means.

The variable resistor 53 is manually adjusted to control the length of time the indicator will operate after the first component of a signal is received. This period should be made as long as is possible, under existing conditions, without allowing the indicator to respond to components subsequent to the first component. The resistor 153 controls the length of the inoperative period occurring after each signal. This should be made as short as possible without allowing the indicator to respond a second time to late arriving components of a signal.

Thus the invention has been described as a system for operating an automatic direction finder on the first component of each element of a telegraphic signal, or on the initially arriving portion of any impulsive signal. The direction finder may be provided with means to prevent bearing indications from being displayed, and a circuit for overcoming said means momentarily upon arrival of a signal. Another arrangement allows the direction finder to remain normally operative, but cuts off the bearing indicator for a predetermined or controlled length of time after the arrival of the first pulse.

I claim as my invention:

1. In combination with a direction finder system including a bilaterally responsive directional receiver system, a non-directive sense receiver system and azimuth indicator means connected to said receiver systems, means for preventing response of said indicator to sky-wave signals comprising detector means connected to said sense receiver, impulse generator means connected to said detector means, and means responsive to said impulse generator means to substantially disconnect said azimuth indicator means from said directional receiver means at the end of a predetermined period after the reception by said sense receiver means of the initial portion of a signal.

2. The invention as set forth in claim 1 wherein said impulse generator includes a differentiating circuit, a rectifier connected to the output of said differentiating circuit, an electron discharge tube including at least an anode, a cathode and a control grid, means for biasing said tube to be normally conductive, connections from the output of said rectifier to the grid and the cathode of said tube, said grid connection including a capacitor, and a grid leak resistor of variable resistance connected to said control grid, whereby said tube is rendered non-conductive in response to the initial portion of a signal applied to said detector, for a period of a duration depending upon the adjustment of said grid leak resistance.

3. In combination with a direction finder system including a bilaterally responsive directional receiver system, a non-directive sense receiver system, amplifier means connected to said receiver systems, azimuth indicator means connected to said amplifier means, means for preventing response of said indicator to sky-wave signals comprising detector means connected to said sense receiver, impulse generator means connected to said detector means, and means responsive to said impulse generator means to block said amplifier means substantially instantaneously at the end of a predetermined period after the reception by said sense receiver means of the initial portion of a signal.

4. In combination with a direction finder system including a bilaterally responsive directional receiver system, a non-directive sense receiver system, amplifier means connected to said receiver systems, azimuth indicator means connected to said amplifier means, means for preventing the response of said indicator to sky-wave signals, comprising detector means connected to said sense receiver, impulse generator means connected to said detector means, and a toggle circuit connected to said impulse generator means, said toggle circuit being connected to said amplifier means to block said amplifier means substantially instantaneously at the end of a predetermined period after the reception of the initial portion of a signal by said sense receiver means.

LOWELL E. NORTON.

REFERENCES CITED

The following references are of record in the file of this patent:

UNITED STATES PATENTS

| Number | Name | Date |
|---|---|---|
| 2,223,995 | Kotowski et al. | Dec. 3, 1940 |
| 2,237,895 | Ulbricht | Apr. 8, 1941 |
| 2,270,773 | Sonnentag et al. | Jan. 20, 1942 |

FOREIGN PATENTS

| Number | Country | Date |
|---|---|---|
| 480,572 | Great Britain | Feb. 24, 1938 |
| 520,606 | Great Britain | Apr. 29, 1940 |